Figure 1:
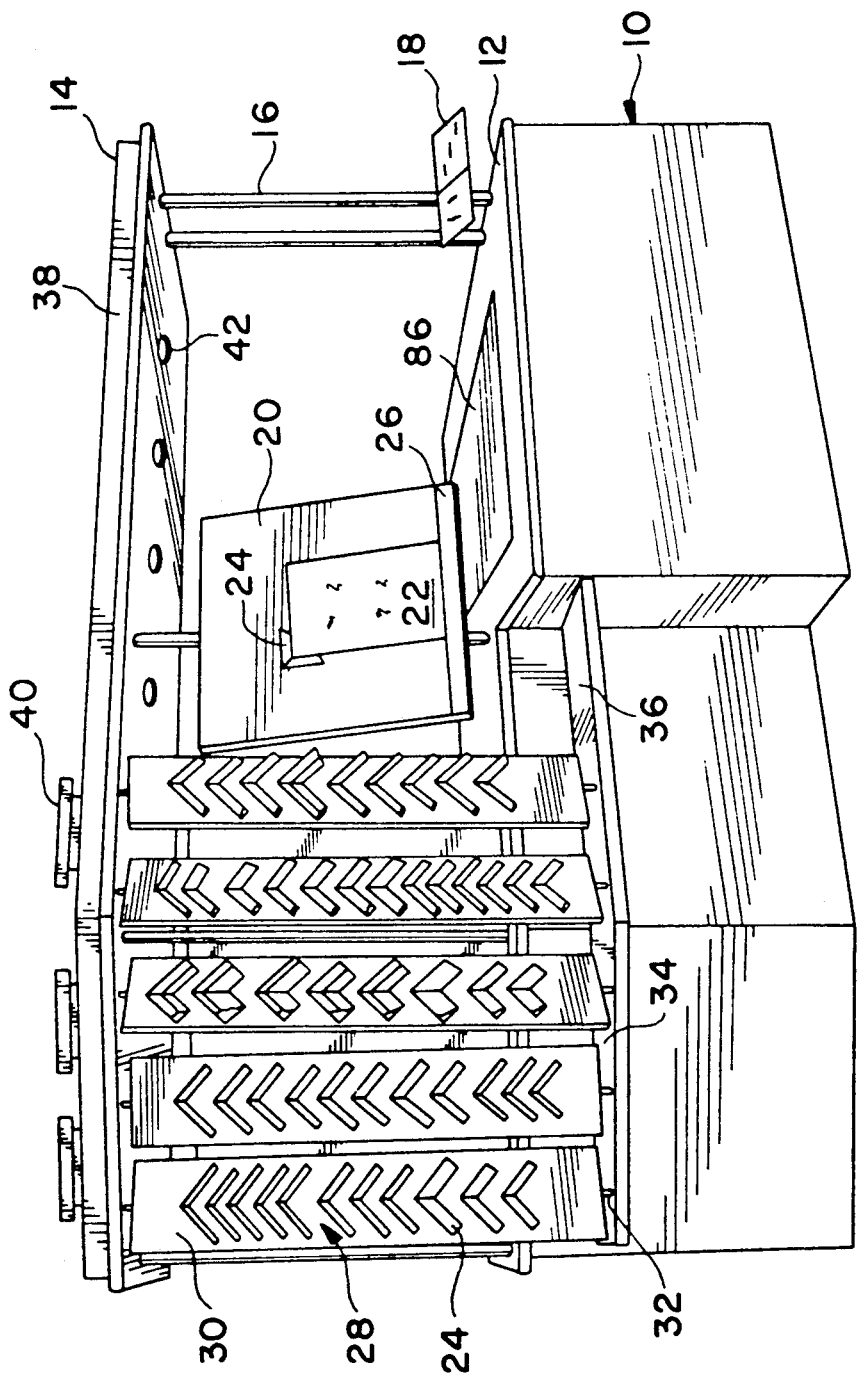

United States Patent [19]

Chanoine et al.

[11] Patent Number: 5,119,854
[45] Date of Patent: Jun. 9, 1992

[54] COMPACT AND ERGONOMIC PICTURE-FRAMING UNIT

[75] Inventors: Michel Chanoine, Limoges; Pascal Magisson, Saint Preist, both of France

[73] Assignee: Albadecor S.A., Sur Gorre, France

[21] Appl. No.: 540,274

[22] Filed: Jun. 19, 1990

[30] Foreign Application Priority Data

Jun. 19, 1989 [FR] France .................. 89 08/22

[51] Int. Cl.⁵ .................................. B27C 9/00
[52] U.S. Cl. ........................ 144/1 R; 144/3 R; 144/3 M; 144/286 R; 144/286 A; 227/76; 227/156
[58] Field of Search ............ 144/1 R, 2 R, 3 R, 3 M, 144/286 R, 286 A, 367, 285; 227/76, 156

[56] References Cited

U.S. PATENT DOCUMENTS

| | | |
|---|---|---|
| 1,784,577 | 12/1930 | Coleman . |
| 1,860,071 | 5/1932 | Bodkin .................. 144/285 |
| 2,020,216 | 11/1935 | Samac .................. 144/1 R |
| 4,029,024 | 6/1977 | Klitzky . |
| 4,869,304 | 9/1989 | Gore .................. 144/2 R |

FOREIGN PATENT DOCUMENTS

| | | |
|---|---|---|
| 8620270 | 10/1986 | Fed. Rep. of Germany . |
| 8804473 | 7/1988 | Fed. Rep. of Germany . |
| 2146016 | 2/1973 | France . |
| 2622137 | 4/1989 | France . |
| 1073087 | 6/1967 | United Kingdom . |

*Primary Examiner*—W. Donald Bray
*Attorney, Agent, or Firm*—Sherman and Shalloway

[57] ABSTRACT

Compact and ergonomic unit for framing pictures using pieces of moulded frame wood, comprising a counter (10) with a top (12) in which are integrated means (42) for cutting the pieces of frame wood, means (44) for stapling the cut portions of frame wood, means (46) for cutting the glass, the cardboard and the mounts, means (28) for presenting the samples (24) of frame wood and means for trying out the coordination between picture/mount/frame wood, as well as a single external electrical connection (98).

18 Claims, 2 Drawing Sheets

COMPACT AND ERGONOMIC PICTURE-FRAMING UNIT

The present invention relates to a compact and ergonomic unit for framing pictures using pieces of moulded frame wood.

A large number of hypermarkets and small businesses wish to provide their customers with a picture-framing service.

In order to perform these services, the shop owners have available a range of very long pieces of frame wood and, once the customer has made his choice, the piece of frame wood must be cut to the dimensions of the picture or of the frame to be obtained, the cut portions assembled and a sheet of glass, a mount and a cardboard backing cut to the dimensions of the frame thus made. Once these cutting operations have been made, the assembly of the frame must be carried out and the backing must be fixed relative to the frame This latter operation is realized in a known manner using staples.

As for cutting the pieces of frame wood, the operator must have available a special saw enabling the pieces of frame wood to be cut at an angle which may vary and may, for example, be 45° for a rectangular frame Such saws are commercially available which have a plate which can move relative to fixed vices The portions of frame wood thus obtained are generally assembled using staples positioned by means of a stapler.

Lastly, in order to cut the backing cardboard, the mounts and the glass, the operator uses a simple table and cutting tools such as a cutter or a diamond, depending on the type of the glass.

So as to be able to take account of the different types of mouldings, the customers have at their disposal a choice of frame wood samples comprising two portions assembled so as to form a frame corner part. French Patent Application No. 2,620,609 proposes a panel for presenting such samples.

In currently existing installations, the various work stations are separated from each other, which requires a relatively considerable space in order to be able to provide such a framing service. Indeed, a working area must be provided around each machine allowing the respective operation to be carried out. A length corresponding substantially to the length of a whole piece of frame wood must also be provided for at least one side of the cutting station. Similarly, for the stapler, a working area must be provided whose largest dimension must be greater than that of the largest frames to be made.

It may also be noted that only one of the faces of the presentation devices is used, which, in light of the large numbers of samples available, obliges the operator to use up a large floor space.

It may also be noted that when the customer tries out the coordination between his picture and a sample of frame wood, the operator is obliged to move and to stand on the same side as the customer in order to advise him. Indeed, the trying out generally takes place either on a horizontal ledge or on a fixed vertical panel which is generally adjacent to the sample-presentation panel.

It has also been noted that the machine or production accessories on these types of installations are scattered around at different points of the installation.

Moreover, each of the work stations of the installation requires a power supply, either in order to make the machine function or for lighting. These installations are also cluttered with electrical wires, extension leads and multiple sockets Such an electrical assembly is prejudicial to safety, more particularly when one bears in mind that the materials being worked are inflammable and that it is almost inevitable that sawdust is present at each of the stations.

Apart from its unattractive appearance, such an installation has numerous disadvantages. A first disadvantage is that it requires a large floor space, which is incompatible with the desire among certain providers of services for a low-outlay diversification, and also incompatible with the costs of commercial floor space.

The provider of the service must, furthermore, carry out a large number of movements in order to make a frame. These movements result in high service costs, in a loss of efficiency and in a poor quality of manufacture. The low level of quality is also caused by the fact that handling at each of the stations is hindered by the presence of the machines of the other work stations, by the poor lighting of the stations or, at the very least, by variations in the quality of lighting from one station to the other.

The advice which may be given to the customer when he is making his choice is also disrupted as the operator of the installation is obliged to interrupt his work in order to aid this customer, for example in his choice of sample.

The object of the present invention is to overcome these disadvantages by proposing a framing unit which is ergonomic and compact, which allows work to be carried out in complete safety whilst at the same time favouring customer/operator exchange, and has a relatively low cost price and running cost.

To this end, the compact and ergonomic unit for framing pictures using pieces of moulded frame wood according to the invention comprises a counter with a top in which are integrated means for cutting the pieces of frame wood, means for stapling the cut portions of frame wood, means for cutting the glass, the cardboard and the mounts, means for presenting the samples of frame wood and means for trying out the coordination between picture/mount/frame wood, as well as a single external electrical connection.

According to another feature, the framing unit according to the invention is characterized in that the integrated cutting means comprise a circular saw fixed on a plate integral with the top and mounted so as to be able to move in rotation, and a pair of vices having two jaws, one which is fixed and the other which can move, which jaws are integral with the top, so as to secure the pieces of frame wood relative to the saw.

The unit according to the invention is also characterized in that the integrated cutting means are connected to an extraction device arranged beneath the top.

According to another feature, the means for stapling the pieces of frame wood comprise a mechanical stapler with a fixed plate, the plate being offset angularly by 45° relative to the longitudinal axis of the counter 10.

According to a particular feature of the invention, the means for cutting the glass, the cardboard and the mounts comprise a meter rule and a sliding guillotine.

The means for presenting the samples of frame wood according to the invention comprise at least one display board mounted so as to be able to move in rotation about its longitudinal axis.

According to the invention, the coordination-testing means comprise a panel whose plane is substantially vertical and which is mounted so as to be able to move in rotation about an axis perpendicular to the top so as to allow visual access to the same face of this panel from either side of the counter by pivoting about the axis of rotation.

The unit according to the invention is also characterized in that it comprises a roof arranged above the counter and fixed to this counter by posts such that the assembly is self-supporting.

Figure 2:
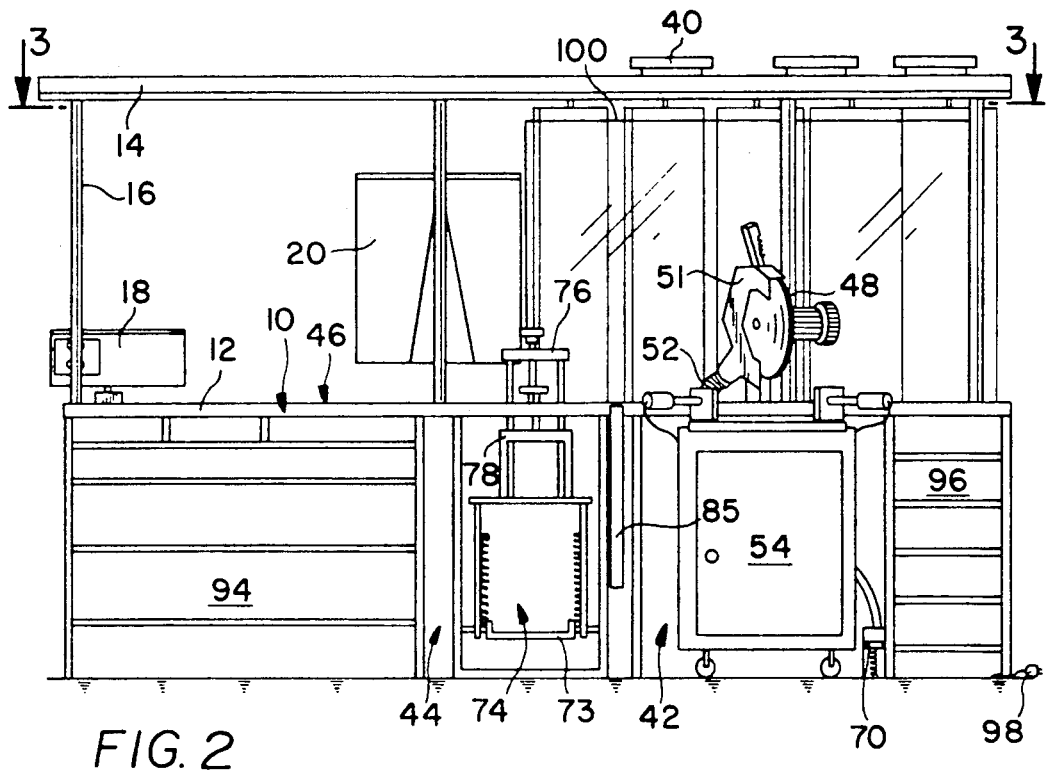
Figure 3:
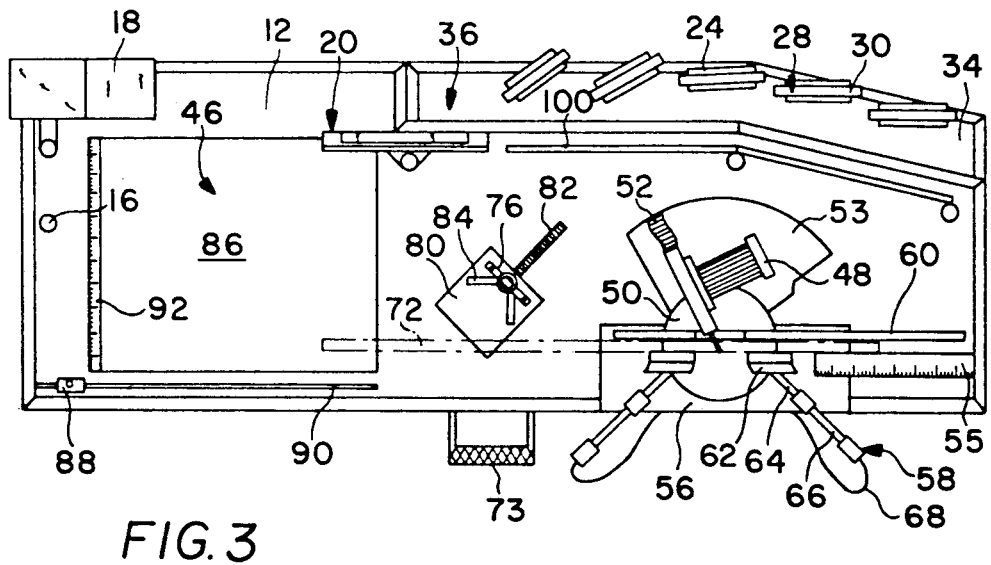

The present invention is described hereinbelow for a particular embodiment and with reference to the attached drawings, in which:

FIG. 1 shows a perspective front view of a framing unit according to the invention, FIG. 2 shows a view in elevation of the rear of the framing unit according to the invention, and FIG. 3 shows a view in cross-section along the line 3—3 in FIG. 2.

The framing unit shown in FIG. 1 comprises a counter 10 with a top 12 surmounted by a roof 14 fixed to this counter by posts 16.

The top 12 is situated at a height such that it may be used as a work surface Immediately above this work surface, a bracket 18, fixed to one of the posts 16, supports an advertising catalogue. A panel 20 for trying out the coordination between a picture 22 and a frame wood sample 24 is provided on another post. This panel, arranged substantially vertically, comprises a rim 26 intended to fix the picture 22 at its lower end and to hold it flat against the panel 20. This panel 20 has a metal surface and the frame wood samples 24 comprise, on their faces intended to come into contact with this panel, a bar of material which is magnetic on its surface such that it enables the sample to remain held flat against the panel once it has been positioned. This panel 20 is mounted rotatably about the post on which it is fixed. Moreover, this panel is arranged between the plate 12 of the counter 10 and the roof 14 such that the same face of the panel can be seen by both the customer and the operator simply by rotation about the post. Furthermore, a space is provided between the lower part of the panel and the top 12 such that the panel may be rotated even when this same top 12 is cluttered with objects.

The framing unit also comprises means 28 for presenting frame wood samples 24, which means consist of several display boards 30 mounted so as to be able to move in rotation about their longitudinal axes. These double-face display boards are provided at each end with an axis 32 which may rotate at the upper part in a housing provided in the roof 14 and at the lower part in a housing provided in a ledge 34 integral with the counter and situated at a height below that of the top 12 but in a plane parallel to it. Both faces of the display boards 30 are metal such that the magnetic bars of the frame wood samples 24 can hold these frame wood samples on these display boards 30. These samples consist, in a known manner, of an assembly of two frame wood portions, each having a miter cut and fixed together in order to form a 90° angle. The frame wood samples 24 may thus be arranged in a chevron over the entire height of the display boards 30. The width of these display boards 30 is slightly less than the distance separating the axes 32 of two adjacent display boards such that the display boards 30 may rotate independently of each other.

As shown in FIG. 1, the presentation means 28 are adjacent to the coordination-testing panel 20 and are arranged such that the display board 30 adjacent to the panel 20 may rotate freely whatever the position of this panel and, conversely, such that the panel 20 may rotate freely whatever the position of the adjacent display board 30.

The ledge 34 extends beneath the coordination-testing panel 20 and creates a free surface forming a shelf 36.

The roof 14 comprises a fascia board 38 above which are arranged lights 40 intended to illuminate the display boards 30. Furthermore, lights 42, intended to illuminate the top 12, are integrated on the lower face of the roof facing the top 12.

FIG. 2, which is a view of the rear of the framing unit in vertical elevation, shows the three work stations, a station 42 for cutting the pieces of frame wood, a station 44 for stapling the cut portions of frame wood and a station 46 for cutting the glass, the cardboard and the mounts, these three stations being integrated into the counter 10.

The station for cutting the pieces of frame wood comprises a circular saw 48 of known type and which is adapted for cutting pieces of moulded frame wood by virtue of an appropriate speed of rotation and toothing.

As can be seen in the cross-section in FIG. 3, this saw 48 is fixed on a circular plate 50, mounted rotatably about an axis passing through its centre, so as to be able to vary the cutting angle of the saw. This saw is provided with a guard 51 which also serves as a collector of sawdust, which is sucked through a duct 52 by the extractor 54 This extractor 54 is soundproofed and housed beneath the counter. The housing itself is padded in order to form an anechoic chamber An opening 53 made in the top 12 enables the duct 52 to move freely. The plate 50 is integrated into a fixed plate 56 which is itself integrated into the top 12. On this fixed plate 56 is provided a pair of vices 58, one jaw 60 of which is fixed and one jaw 62 of which can move. This movable jaw 62 is fixed at the end of a rod 64 mounted slidably in a tube 66 and pushed out of this tube by a spring.

Moreover, this rod 64 is integral with the end of a cable 68 of the bicycle cable type mounted in a sheath, the other end of the cable being integral with a pedal 70, as shown in FIG. 2.

The saw 48 is also completed by a fixed meter rule 55 defining the correct position of the piece of frame wood in order to obtain a portion of given length.

In FIG. 3, a piece of frame wood 72 is shown in the position locked between the jaws 60 and 62 of the vices 58.

The stapling station 44 comprises a mechanical stapler 74 with a pedal 73, the anvil 76 and the striker 78 of which can move whereas the plate 80 is integrated into the top 12 of the counter 10. This rectangular plate 80 is arranged at 45° relative to the longitudinal axis of the counter. The sides of the plate are thus oriented at 45° relative to the axis of pivoting of the pedal 73. The magazine of staples 82 is also integrated into the plate 12 and it is directly accessible from above. Guides 84 are provided on the plate 80 in order to allow the cut pieces of frame wood to be positioned correctly when they are being assembled.

Similarly, a tilting arm 85 is fixed to the top 12 by a locking hinge known per se. The tilting-up movement takes place perpendicular to the longitudinal axis of the counter.

The station 46 for cutting the glass, the cardboard and the mounts comprises a removable cutting board 86 made from a soft material so that it can be cut by the blades of cutting tools such as cutters This removable board 86 is encased in the work surface 12 such that any projection is prevented Furthermore, a guillotine 88 of the type sliding on rails 90 enables different sheets of materials used to be cut.

The rails 90 are mounted parallel to the longitudinal axis of the counter. A measuring accessory such as a rule 92 is provided parallel to one of the sides of the removable board 86 and, in order to prevent projection, this rule 92 is also integrated into the top 12.

That part of the counter 10 situated at right angles to the cutting station 46 comprises several shelves 94 intended for storing the various sheets of cardboard and glass. Similarly, at the opposite end of the counter, compartments 96 are provided which are intended to collect together the various accessories used at each of the work stations.

A single electricity supply 98 enables the framing unit to be connected to a source of electrical energy. The electrical distribution network within the unit itself, on the other hand, is completely integrated and the cables supplying the lights arranged on the roof pass through the posts 16 which are tubular posts.

In FIG. 3, a safety screen 100, for example made from glass, has been shown, placed between the presentation means 28 and the cutting and stapling stations.

The functioning of the framing unit according to the invention is now described.

The customer approaches the front part of the framing unit as shown in FIG. 1. He can first consult the catalogue arranged on the support 18 so as to familiarize himself with the services offered. The customer uses the shelf 36 to put down his personal belongings so as to have his hands free to handle the display boards 30 and select a certain number of samples. He then places his picture 22 on the panel 20, locking the lower part of the picture in the rim 26. He then places in the top left or right corner of his picture one of the frame wood samples 24 which he will have picked out beforehand so as to make his final choice. While he is trying out the samples, he may pivot the panel 20 so that the operator situated on the other side of the counter can also give his opinion. In this case, the operator may propose mount samples so as to coordinate the picture-mount-frame wood ensemble.

Once the choice has been made and the type of frame wood selected, the operator situated behind the unit such as shown in FIG. 2, after having measured the dimensions of the picture to be framed, sets about making the frame itself. The operator places the piece of frame wood 72 in the pair of vices 58 after having positioned it at the correct length and then makes a 45° cut, for example for a rectangular frame, by means of the saw 48. Once the portion has been cut off, he exerts a pressure on the pedal 70 so that the cable 68 pulls on the rod 64 and causes it to slide within the tube 66, thus causing the movable jaw 62 to be withdrawn and freeing the cut-off portion, as well as the remaining portion of the piece of frame wood. In a known manner, the starting up of the saw simultaneously causes the extractor 54 to be started up so as to collect the sawdust.

Once the portions of frame wood have been cut, the operator assembles them together by means of the stapler 74. The operator takes hold of two portions of frame wood, one in each hand, which he positions so that they bear on the fixed plate 80 between the blocks 84 such that the abutting corner is situated between the movable anvil 76 and striker 78. Once the portions have been correctly positioned, the operator exerts a pressure by foot on the pedal 73 of the stapler 74 so as to cause a staple to penetrate simultaneously into the two portions of frame wood to be assembled. When the frame has been completed, the latter is put to one side and the operator then proceeds to cut the backing, the glass and if necessary the mount.

The sheets of cardboard used for the backings and for the mounts are taken from the shelves 94 and positioned on the board 86. Using the guillotine 88, the operator proceeds to cut these cardboard elements to size. Although the board 86 allows him to carry out finishing cutting operations, it also allows him to cut sheets of mineral or organic glass.

The operator then proceeds to assemble the whole frame. In order to do this, he uses known accessories such as a stapler in order to lock the glass/mount/picture/backing assembly inside the frame, but he also uses adhesive tape and other fastenings for the frame which enable it to be hung.

The advantages provided by the framing unit according to the invention are numerous.

The integration of all the stations with the superposition of the working spaces allows a considerable space saving to be made.

More particularly, the 45° orientation of the stapler plate allows a substantial space saving to be made.

Indeed, the piece of frame wood to be cut initially with a length of approximately 2 to 3 meters rests entirely on the entire length of the counter, thus straddling the stapling station and the station for cutting the glass, the cardboard and the mounts whilst it is being cut. Similarly, during the stapling the cut portions of frame wood extend over the saw-cutting station 42 and the station 46 for cutting the glass, the cardboard and the mounts.

It can also be appreciated that, independent of which cutting 42, 46 or stapling 44 station the operator is working at, he can, without leaving off the work in progress, consult the panel 20 which a customer is showing him.

Similarly, as a result of the elevation of this panel 20, the customer can turn the panel 20 around when the operator is, for example, occupied stapling cut portions of frame wood at the stapling station 44.

In addition to being compact, this unit is completely ergonomic since the movements of the operator behind the counter are reduced to a minimum and since he has all the accessories within hand's reach Similarly, the work surface is very well lit, which enables high-quality finishing operations to be carried out and the customers can also make their choice of frame wood in highly satisfactory lighting conditions which result in a good rendering of colours.

Safety is also observed since the screen 100 protects the cutting 42 and stapling 44 stations. The screen 100 prevents any accident, even in the event of clumsiness or of an arm being introduced between two display boards 30. Similarly, since all the electrical circuits of the unit are integrated, just one electrical cable 98 ensures the connection, which limits all the risks inherent in detachable and multiple connections.

The framing unit which has just been described may also be completed with shelves for storing pieces of frame wood arranged parallel to the counter and behind it, a removable chain link between these shelves and the counter enabling an area to be defined in which the operator moves, preventing unauthorized people from having access to the rear face of the counter.

Similarly, the pedal-operated mechanical stapler may be replaced by an electric stapler.

The vices 58 according to an alternative of the invention may have jaws 62 which can move but are driven by electric jacks. In this case, the pedal 70 is replaced by a foot switch.

The double-face display boards 30 which have just been described may be replaced by parallelepipeds so as to have four faces instead of two, thus increasing the surface area for presentation.

We claim:

1. A compact and ergonomic unit for selecting, viewing and forming picture frames from lengths of wood molding frame, said unit comprising
   a counter having a first substantially horizontal top shelf providing thereon at a first cutting station a surface for cutting glass, cardboard and mounts used to form a completed picture frame,
   first means for cutting glass, cardboard and mounts on said surface, said first cutting means being secured to said counter at said first cutting station,
   second means for cutting a length of wood molding framing into shorter lengths according to a picture to be framed, said second cutting means being secured to said counter at a second cutting station, thereof,
   means for stapling together the shortened lengths of wood molding framing to form a picture frame, said stapling means being secured to said counter at a stapling station thereof,
   means for presenting samples of wood molding frame to allow a customer to view and select a wood molding frame sample, said presenting means being secured to said counter at a presenting station thereof,
   means for assembling and viewing the selected wood molding frame sample and a picture or both picture and mount therefor, said assembling and viewing means being secured to said counter at an assembling and viewing station thereof, and
   a single external electrical connector for connecting electrically driven devices associated with said unit to an electrical supply source.

2. A unit according to claim 1 wherein the first and second cutting stations are provided at opposite ends of said counter and said stapling station is located intermediate said cutting stations.

3. A unit according to claim 1, wherein the second cutting means comprises a circular saw fixed to a plate rotatably mounted on said top shelf at said second cutting station so as to be able to move in rotation with said circular saw relative to said top shelf.

4. A unit according to claim 3 which further comprises a pair of vices having two jaws, one which is fixed with respect to said counter and the other which can move, said jaws being attached to said top surface at said second cutting station, so as to be able to secure a length of wood molding relative to the second cutting means.

5. A unit according to claim 3, wherein the movable jaw further comprises automatic-pressing mechanical drive means.

6. A unit according to claim 1, wherein the second cutting means further comprises an extraction device located beneath said top shelf of said counter, said extraction means collecting debris generated by said second cutting means during cutting.

7. A unit according to claim 1, wherein the means for stapling comprises a mechanical stapler with a fixed plate oriented at 45° relative to the longitudinal axis of the counter.

8. A unit according to claim 1, further comprising a magazine of staples operably connected to said stapling means, said magazine being fixed to the top shelf and being accessible from above.

9. A unit according to claim 1, wherein the first cutting means comprises a removable board made from soft material so that it can be cut by cutting tools.

10. A unit according to claim 1, wherein the first cutting means comprises a meter rule and a sliding guillotine which are mounted to the top shelf at said first cutting station.

11. A unit according to claim 1, wherein the means for presenting samples comprises at least one movable display board mounted to said unit so as to be able to move in rotation about its longitudinal axis.

12. A unit according to claim 11, wherein at least one movable display board comprises at least two faces.

13. A unit according to claim 11, wherein the samples of wood molding frame comprise bars of magnetic material and wherein the movable display board has a metal outer surface so that the samples can be magnetically fixed in a removable manner on the movable display board.

14. A unit according to claim 1, wherein the assembling-viewing means comprises a panel which is substantially vertical and mounted to said unit so as to be able to move in rotation about an axis perpendicular to the counter so as to allow visual access to the same face of this panel from either side of the counter.

15. A unit according to claim 13, wherein the panel has a metal surface sol as to receive the samples of wood molding frame provided with bars of magnetic material.

16. A unit according to claim 13, wherein the panel comprises a rim at its lower part in order to retain a picture placed flat on this panel.

17. A unit according to claim 1 further comprising a roof arranged above the counter and fixed to it by posts such that the assembly is self-supporting.

18. A unit according to claim 16, which further comprises lights fixed to the roof and electrical-supply cables for said lights through the posts and electrically connected to said single external electrical connector.

* * * * *

UNITED STATES PATENT AND TRADEMARK OFFICE
CERTIFICATE OF CORRECTION

PATENT NO. : 5,119,854

DATED : June 9, 1992

INVENTOR(S) : MICHEL CHANOINE, ET AL.

It is certified that error appears in the above-identified patent and that said Letters Patent is hereby corrected as shown below:

On the title page: Item
[30] Foreign Application Priority Document,
"89 08/22" should read --89 08/122--.

Signed and Sealed this

Fourteenth Day of September, 1993

Attest:

BRUCE LEHMAN

Attesting Officer

Commissioner of Patents and Trademarks